United States Patent [19]

Grois et al.

[11] Patent Number: 5,062,683
[45] Date of Patent: Nov. 5, 1991

[54] STRAIN RELIEF CONNECTOR FOR OPTICAL FIBER

[75] Inventors: Igor Grois; Mark Margolin, both of Lincolnwood, Ill.

[73] Assignee: Molex Incorporated, Lisle, Ill.

[21] Appl. No.: 549,872

[22] Filed: Jul. 9, 1990

[51] Int. Cl.⁵ .......................... G02B 6/26; G02B 6/36
[52] U.S. Cl. .................................................. 385/87
[58] Field of Search ........................ 350/96.20–96.22

[56] References Cited

U.S. PATENT DOCUMENTS

| | | | |
|---|---|---|---|
| 4,190,317 | 2/1980 | Makuch | 350/96.20 |
| 4,204,306 | 5/1980 | Makuch | 350/96.20 |
| 4,440,469 | 4/1984 | Schumacher | 350/96.20 |
| 4,634,214 | 1/1987 | Cannon, Jr. et al. | 350/96.20 |

*Primary Examiner*—Akm Ullah
*Attorney, Agent, or Firm*—Louis A. Hecht; Stephen Z. Weiss; A. A. Triva

[57] ABSTRACT

An optical fiber connector for terminating and providing strain relief on an optical fiber cable having an inner fiber, an outer jacket and longitudinal strength material therebetween. A housing has a rear input end into which the fiber, stripped of the outer jacket, extends, along with a front termination end. The rear input end of the housing is externally threaded and about which the longitudinal strength material is positionable. An internally threaded strain relief member is provided and through which the cable extends. The strain relief member is threadable onto the externally threaded rear input end of the housing to clamp the longitudinal strength material directly between the threads of the housing and the strain relief member. Grooves span the threads of the housing to prevent at least some of the longitudinal strength material from spiralling with the threads when the strain relief member is threaded onto the housing.

14 Claims, 2 Drawing Sheets

STRAIN RELIEF CONNECTOR FOR OPTICAL FIBER

FIELD OF THE INVENTION

This invention generally relates to optical fiber connectors and, particularly, to such a connector which provides strain relief on strength material in the optical fiber cable.

BACKGROUND OF THE INVENTION

Low loss optical fibers are being used, at an ever increasing rate, in the communications industry for transmitting signals. The fibers are assembled into cables which include an outer protective jacket or cladding. The inner or central fiber often is enclosed by a buffer cover or interior jacket, such as of plastic material. A strength system most often is incorporated in the cable, such as between the outer jacket and the inner jacket. One of the most popular strength systems incorporates non-metallic, filamentary strength members, such as polymeric yarn, between the outer jacket and the inner fiber jacket.

Low loss optical fibers are coupled through complementarily mateable connectors which are designed to preserve the low loss capabilities of the fibers. However, a continuing problem in avoiding losses between coupled fibers is the application of forces longitudinally of the fibers after portions of the surrounding jackets have been removed for termination. Any pulling forces on the optical fiber cable must be transferred to the mating connectors in order to avoid degrading the quality of the transmission.

There are many optical fiber connectors which are designed for providing strain relief for the optical fiber cable, but the connectors usually are of a very complicated design involving a plurality of parts which must be fabricated to considerable precision and, consequently, the myriad of parts themselves can degrade the quality of transmission between coupled optical fiber ends. An example of a connector for an optical fiber cable is shown in U.S. Pat. No. 4,863,235 to Anderson et al., dated Sept. 5, 1989. This patent shows a connector wherein non-metallic filamentary strength members, or yarn, are clamped by a wedge system which includes a plurality of components, including an interior wedge sleeve externally threaded to an internally threaded compression nut which biases the strength members against still a further truncated member about which the strength members are disposed. Like so many other similar connectors, all of these components must be fabricated individually, to precision, in addition to the other housing and related components of the connector which terminate the optical fiber to another fiber in a complementarily mateable connector.

This invention is directed to solving the problem of strain relief on optical fibers and satisfying the continuing need of a simplified system to combat losses in optical fibers due to pulling forces exerted on the optical fiber cable.

SUMMARY OF THE INVENTION

An object, therefore, of the invention is to provide a new and improved optical fiber connector for providing strain relief on an optical fiber cable.

In the exemplary embodiment of the invention, the optical fiber connector is designed for terminating and providing strain relief on an optical fiber cable which includes an inner or central optical fiber, an outer jacket or cladding and longitudinal strength material, such as polymeric yarn, disposed therebetween. The connector includes a housing having a rear input end into which the optical fiber, stripped of its outer jacket, extends. The housing has a front termination end which may include a plastic or ceramic ferrule for locating the terminating end of the fiber. The rear input end of the housing is externally threaded and about which the longitudinal strength material is positionable. An internally threaded strain relief member, through which the optical fiber cable extends, is threadable onto the externally threaded rear input end of the housing to clamp the longitudinal strength material directly between the threads. Therefore, no internal or extraneous components whatsoever are required to provide strain relief on the cable.

A unique feature of the invention is the provision of interruption means between the housing and the strain relief member to prevent at least some of the longitudinal strength material from spiralling with the threads when the strain relief member is threaded onto the rear input end of the housing. As disclosed herein, the interruption means are provided in the form of groove means spanning the threads on at least one of the housing or strain relief member, the groove means extending longitudinally of the cable or generally parallel to the rotating axis of the two components.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE PREFERRED EMBODIMENT

Figure 1:
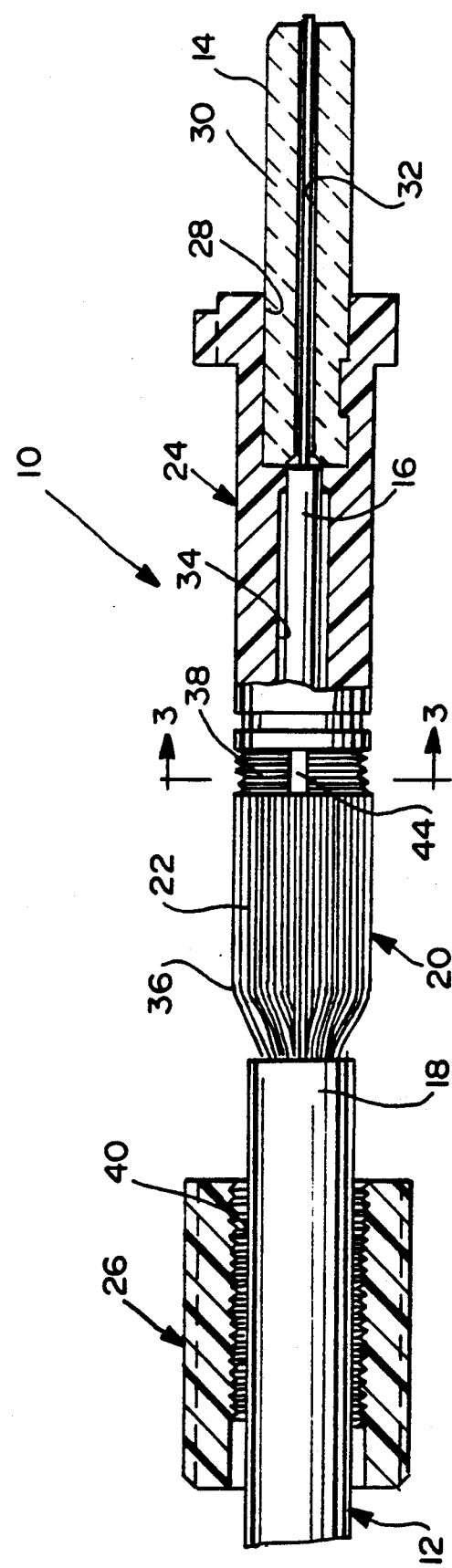
FIG. 1 is a longitudinal or axial section through the optical fiber connector of the invention, particularly a complete section through the strain relief member and a fragmented section through the housing of the connector, with the components of the optical fiber cable in position for termination prior to the strain relief member being threaded onto the housing.

Referring to the drawings in greater detail, and first to FIG. 1, the invention is embodied in an optical fiber connector, generally designated 10, for terminating and providing strain relief on an optical fiber cable, generally designated 12. The optical fiber cable includes an inner or central optical fiber 14 surrounded by a buffer cover or inner jacket 16 of plastic or like material, an outer jacket or protective cladding 18, and a strength member system, generally designated 20. The strength member system is in the form of longitudinal strength material or strands 22, such as of polymeric yarn.

Optical fiber connector 10 includes a housing, generally designated 24, and a strain relief member, generally designated 26. Housing 24 may be of a variety of configurations designed particularly at its forward end for mating with a complementarily mateable connector (not shown). Basically, the housing must include a passageway for optical fiber 14, stripped of outer jacket 18, to extend. In the design of the housing shown in the drawings, a forward enlarged passage portion 28 is provided for receiving a plastic or ceramic ferrule 30 which, itself, includes a central passageway 32 which locates fiber 14 for termination. The housing also includes a smaller passage portion 34 for receiving an end of buffer cover 16 of the cable. Passage portion 34 extends all the way to the rear input end of housing 24, the rear input end being located generally where strength material 22 bends, as at 36. In essence, the housing is provided with a rear input end 38 into which fiber 14 and buffer cover 34, stripped of outer jacket 18, extend. The rear input end is externally threaded, as shown, and about which the longitudinal strength material 22 is positionable.

Strain relief member 26 generally is in the form of a sleeve having an internally threaded bore 40 through which optical fiber cable 12 can extend. Internally threaded bore 40 of strain relief member 2 is complementary to externally threaded end 38 of housing 24.

Figure 2:
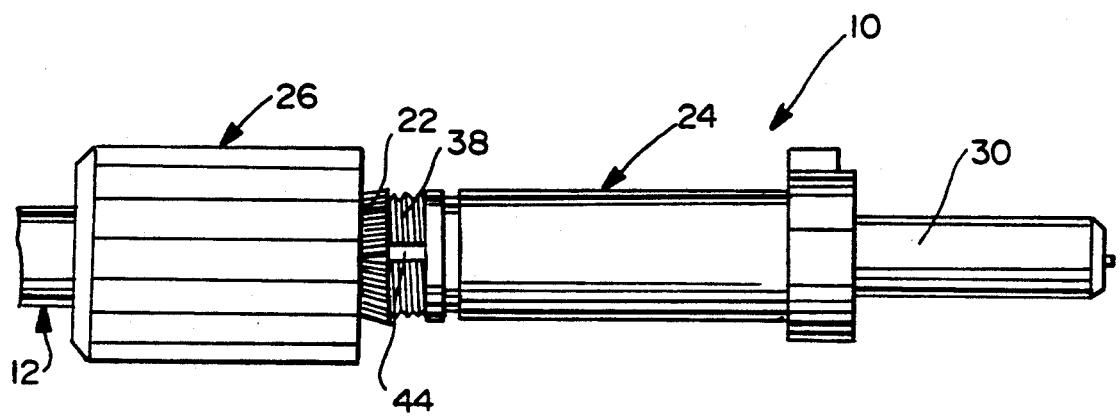
FIG. 2 is an elevational view of the connector fully assembled with the strain relief member completely threaded onto the rear of the housing.

In operation, and referring to FIG. 2 in conjunction with FIG. 1, outer jacket or cladding 18 first is stripped from a given length of the end of optical fiber cable 12 to be terminated. The given length is slightly longer than the combined length of housing 24, including ferrule 30. Longitudinal strength material 22 then is cut to a length to cover a substantial portion if not the entire length of externally threaded portion 38 of housing 24. Buffer cover 16 also is severed to a length equal to the length of passage portion 34 through the housing, leaving a bared length of fiber 14 for extending through ferrule 30. As is conventional, the fiber may extend slightly beyond the outer distal end of ferrule 30 for polishing.

Before proceeding, it should be commented that longitudinal strength material 22 is shown in the drawings with the strands somewhat exaggerated in cross-sectional size in order to facilitate the illustration. Actually, such strength material as polymeric yarn is extremely fine but very strong and flexible.

Once the components of optical fiber cable 12 are cut and positioned relative to housing 24 as shown in FIG. 1, strain relief member 26 is threaded onto externally threaded rear end 38 of housing 24 as shown in FIG. 2. This tightly clamps the fine strength material 22 directly between the complementary threads of the housing and the strain relief member to resist longitudinal forces on cable 12 and transmit those forces directly to the connector itself in order to avoid strain on fiber 14 and prevent any resulting transmission losses. It can be seen that, except for the use of fiber centering ferrule 30, a complete connector with strain relief capabilities are provided by only the two components of housing 24 and strain relief member 26.

Figure 3:
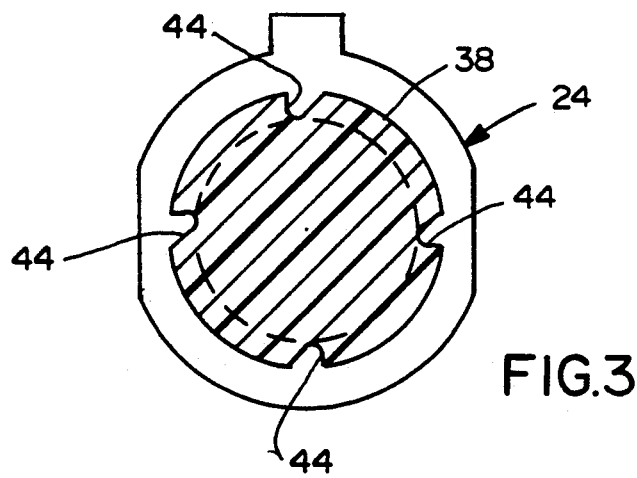
FIG. 3 is a vertical section, on an enlarged scale, taken generally along line 3—3 of FIG. 1.

Another feature of the invention is the provision of interruption means to prevent longitudinal strength material 22 from spiralling along with the threads when strain relief member 26 is threaded onto externally threaded rear end 38 of housing 24. As contemplated herein, and referring to FIG. 3 in conjunction with FIGS. 1 and 2, the interruption means are provided in the form of grooves 44 spanning the threads of at least one of the housing or strain relief member. As seen, for ease of manufacture, the grooves are cut longitudinally through the threads of rear input end 38 of housing 24. As shown in FIG. 3, the grooves are cut substantially entirely to the base or root of the threads. During use, a considerable number of the very fine strands of strength material 22 are captured in these grooves to insure that at least some of the longitudinal strands or yarn extend lengthwise of the cable over at least a portion of the length or axial dimensions of the threaded portions of the housing and strain relief member. Again, it must be kept in mind that the strands are extremely fine and will not interfere with the threading function of the strain relief member.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An optical fiber connector for terminating and providing strain relief on an optical fiber cable having an inner fiber, an outer jacket and longitudinal strength material therebetween, comprising:

a housing having a rear input end into which the fiber, stripped of the outer jacket, extends and a front termination end, the rear input end being externally threaded and about which the longitudinal strength material is positionable; and an internally threaded strain relief member through which the cable extends, the strain relief member being threadable onto the externally threaded rear input end of the housing to clamp the longitudinal strength material therebetween.

2. The optical fiber connector of claim 1 wherein the threads on at least one of said housing and strain relief member include interruption means to prevent at least some of the longitudinal strength material from spiralling with the threads when the strain relief member is threaded onto the housing.

3. The optical fiber connector of claim 2 wherein said interruption means comprise groove means spanning the threads longitudinally of the cable.

4. The optical fiber connector of claim 3 wherein the groove means is of a depth at least to the root of the spanned threads.

5. An optical fiber termination system, comprising in combination:

an optical fiber cable having at least an inner fiber, an outer jacket and longitudinal strength material therebetween;

a housing having a central passageway and a rear input end into which the fiber, stripped of the outer jacket, extends through the passageway to a front termination end of the housing, the rear input end being externally threaded and about which the longitudinal strength material is positionable; and a strain relief sleeve having a through bore through which the optical fiber cable extends, the strain relief sleeve being internally threaded complementary to the externally threaded rear input end of the housing whereby, upon threading the strain relief sleeve onto the rear input end of the housing, the longitudinal strength material of the optical fiber cable is clamped between the respective threads of the rear input end and the strain relief sleeve.

6. The optical fiber termination system of claim 5 wherein the threads on at least one of the housing and strain relief sleeve include interruption means to prevent at least some of the longitudinal strength material from spiralling with the threads when the strain relief sleeve is threaded onto the rear input end of the housing.

7. The optical fiber termination system of claim 6 wherein said interruption means comprise groove means spanning the threads longitudinally of the cable.

8. The optical fiber termination system of claim 7 wherein the groove means is of a depth at least to the root of the spanned threads.

9. An optical fiber connector for terminating and providing strain relief on an optical fiber cable having an inner fiber, an outer jacket and longitudinal strength material therebetween, comprising:
   a first member through which the fiber, stripped of the outer jacket, extends, the first member being externally threaded and about which the longitudinal strength material is positionable; and
   an internally threaded second member for threading onto the externally threaded first member to clamp the longitudinal strength material directly between the threads of the first and second members.

10. The optical fiber connector of claim 9, including means in the threads between the first and second members to prevent at least some of the longitudinal strength material from spiralling with the threads when the first and second members are threaded together.

11. The optical fiber connector of claim 10 wherein said last name means comprise groove means spanning the threads of at least one of the first and second members.

12. The optical fiber connector of claim 11 wherein said groove means are of a depth at least to the base of the threads.

13. A method of terminating and providing strain relief on an optical fiber cable having an inner fiber, an outer jacket and longitudinal strength material therebetween, comprising the steps of:
   providing an optical fiber connector with a first, externally threaded member and a second, internally mateable threaded member;
   stripping a length of the jacket from an end of the optical fiber cable to expose the inner fiber and the longitudinal strength material;
   positioning the fiber through the first, externally threaded member with the longitudinal strength material about the external threads of the first member; and
   threading the second, internally threaded member onto the first, externally threaded member to clamp the longitudinal strength material directly between the respective threads of the members.

14. The method of claim 13 including interrupting the longitudinal strength material to prevent at least some of the material from spiralling with the threads when the first and second members are threaded together.

* * * * *